(12) United States Patent
Tiemann et al.

(10) Patent No.: US 11,221,505 B2
(45) Date of Patent: Jan. 11, 2022

(54) METHOD AND DEVICE FOR CHECKING THE CENTERING OF AT LEAST ONE SPECTACLE LENS

(71) Applicant: Rodenstock GmbH, Munich (DE)

(72) Inventors: Markus Tiemann, Munich (DE); Martin Dumm, Kirchberg (DE); Monika Füss, Munich (DE); Roswitha Fendt, Munich (DE); Holger Wild, Schaufling (DE)

(73) Assignee: Rodenstock GmbH, Munich (DE)

( * ) Notice: Subject to any disclaimer, the term of this patent is extended or adjusted under 35 U.S.C. 154(b) by 355 days.

(21) Appl. No.: 16/324,624

(22) PCT Filed: Jun. 20, 2017

(86) PCT No.: PCT/EP2017/000718
§ 371 (c)(1),
(2) Date: Jun. 10, 2019

(87) PCT Pub. No.: WO2018/028808
PCT Pub. Date: Feb. 15, 2018

(65) Prior Publication Data
US 2019/0302485 A1  Oct. 3, 2019

(51) Int. Cl.
*G02C 13/00* (2006.01)
*B29D 11/00* (2006.01)
*G02C 7/02* (2006.01)

(52) U.S. Cl.
CPC ...... *G02C 13/005* (2013.01); *B29D 11/00951* (2013.01); *G02C 7/021* (2013.01)

(58) Field of Classification Search
CPC . G02C 13/005; G02C 7/021; B29D 11/00951
See application file for complete search history.

(56) References Cited

U.S. PATENT DOCUMENTS

| 7,538,863 | B2 | 5/2009 | Divo |
| 2011/0205487 | A1* | 8/2011 | Sauer ............... G02C 13/005 351/204 |

(Continued)

FOREIGN PATENT DOCUMENTS

| DE | 10333426 A1 | 2/2005 |
| DE | 102008039416 A1 | 2/2010 |

(Continued)

OTHER PUBLICATIONS

European Patent Office, Search Report issued for PCT/EP2017/000718, 6 pgs., dated Sep. 28, 2017.

*Primary Examiner* — Tuyen Tra
(74) *Attorney, Agent, or Firm* — Schiff Hardin LLP

(57) ABSTRACT

In a method for checking the centration of at least one spectacle lens, the spectacle lens is arranged in a field of capture of an image capturer; at least one image of the spectacle lens is captured by means of the image capturer; and positions of functional engravings of the spectacle lens in the captured image are determined. Furthermore, at least one lens contour of the at least one spectacle lens in the captured image is determined and the centration of the spectacle lens is checked taking into account the determined positions of the functional engravings, the determined lens contour and a known, wearer-dependent target geometry of the centration.

15 Claims, 3 Drawing Sheets

(56) References Cited

U.S. PATENT DOCUMENTS

Figure 1:
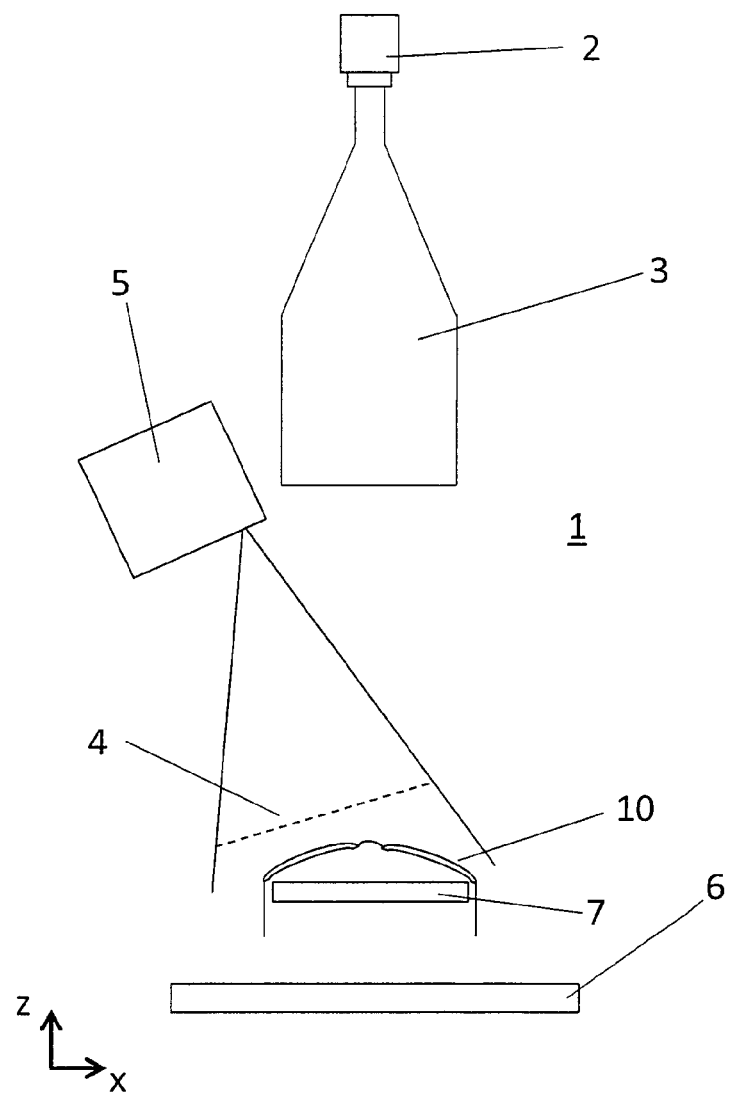

2014/0098342 A1* 4/2014 Webb .................. A61B 3/0008
 351/206
2015/0277154 A1 10/2015 Hofmeister et al.

FOREIGN PATENT DOCUMENTS

| | | | |
|---|---|---|---|
| DE | 102014005281 | A1 | 10/2015 |
| EP | 1692565 | A2 | 8/2006 |
| EP | 1692563 | B1 | 6/2013 |
| WO | 2010/017955 | A1 | 2/2010 |

\* cited by examiner

METHOD AND DEVICE FOR CHECKING THE CENTERING OF AT LEAST ONE SPECTACLE LENS

BACKGROUND

The invention relates to a method and a device for checking the centration of at least one spectacle lens.

As a rule, the spectacle lenses of optical spectacles are edge-shaped in line with specific target values, which may depend on the wearer of the spectacles. For example, the optical spectacle lenses of the spectacles always are to be arranged in the spectacle frame in such a way that visual points of the wearer's eyes in the wearing position are arranged at predetermined positions on the respective spectacle lenses. In this connection, it is said that the spectacle lenses are correctly centered in the frame of the spectacles.

Checking of this centration of the spectacle lenses, i.e. checking of a manufacturing quality and/or a fitting quality, can be done either on the finished spectacles or on the edge-shaped spectacle lenses.

Conventionally, checking of the centration is performed by manual measuring methods, e.g. by marking the functional engravings and measuring distances with a pupillary distance ruler at the opticians. Manual checking is always error prone as it is performed by human persons.

Furthermore, there are known partially automated methods for checking the centration, the fitting height and/or the pupillary distance, in which individual points (such as a centering point) are first pre-marked on the spectacle lenses.

Optical parameters and terms such as e.g. "pupillary distance", "fitting height", "centering point", "wearing position", "functional engravings", "visual point" etc. are defined in relevant standards, such as DIN EN ISO 1366, DIN 58 208, DIN EN ISO 8624 and DIN 5340 and can be taken therefrom.

SUMMARY

It is the object of the invention to simplify and/or improve the checking of the centration.

One aspect relates to a method for checking the centration of at least one spectacle lens, comprising the steps of:
- arranging the spectacle lens in a field of capture of an image capturing device;
- capturing at least one image of the spectacle lens by means of the image capturing device;
- determining the position of functional engravings of the spectacle lens in the captured image;
- determining at least one lens contour of the spectacle lens in the captured image; and
- checking the centration of the at least one spectacle lens taking into account the determined position of the functional engravings, the determined lens contour of the spectacle lens and a known, wearer-dependent target geometry of the centration.

The method can be carried out both for checking the centration of finished spectacles and for checking edge-shaped spectacle lenses. Here, finished spectacles mean a spectacle frame in which spectacle lenses are fit as optical lenses. Edge-shaped spectacle lenses mean spectacle lenses that are e.g. made of a lens blank and are edges of which are shaped such that they can be fit into a particular spectacle frame without further processing to thus form finished spectacles. The method is carried out at least on one spectacle lens. In particular, it can be carried out on two spectacle lenses simultaneously or successively, both of which are intended for a single pair of spectacles. Since the method can be carried out on the two spectacle lenses of a pair of spectacles as a rule, reference is made to spectacle lenses, i.e. in the plural below, even if the method basically can be performed already on a single, e.g. edge-shaped spectacle lens.

In the method, first the finished spectacles or the edge-shaped spectacle lenses are arranged in the field of capture of the image capturing device. The image capturing device may be a camera, in particular a digital camera, such as a CCD camera. The field of capture of the image capturing device may be a substantially three-dimensional spatial region that can be captured by the image capturing device. As a rule, the field of capture comprises a spatial region in front of an objective and/or a lens of the image capturing device, which is intersected by an optical axis of the image capturing device.

The finished spectacles and/or the edge-shaped spectacle lenses can be arranged in a known distance and orientation with respect to the image capturing device, in particular with respect to an optical capture axis of the image capturing device. This distance and orientation can be part of a calibration that is taken into account when checking the centration.

The image is captured with the image capturing device, in particular a digital image of the finished spectacles or the edge-shaped spectacle lenses can be captured and/or created. The image includes at least parts of the finished spectacles or the edge-shaped spectacle lenses. In particular, the image may substantially completely include the two edge-shaped spectacle lenses or the finished spectacles. With the image capturing device, either a single image or multiple images can be captured. The captured image preferably includes an image detail, in which a spatial region and/or object arranged behind the spectacle lenses (i.e. on the side of the spectacle lenses facing away from the image capturing device) is imaged through one or both of the spectacle lenses. The image may be captured at least partially from a perspective against or in a zero direction of sight through the spectacles and/or the edge-shaped spectacle lenses.

After the image has been captured, the position of the functional engravings of the finished spectacles or the edge-shaped spectacle lenses in the captured image is determined. As a rule, optical spectacles have at least two functional engravings that can be used to correctly center, edge-cut, and/or place the spectacle lenses in a spectacle frame. The exact location of the functional engravings on the spectacle lenses may vary from manufacturer to manufacturer. As a rule, spectacle lenses have two functional engravings, one of which is arranged nasally and one temporally from an optical center and/or a centering point of the respective spectacle lens. In the case of decentered lenses, the optical center and/or the centering point of the spectacle lens may be shifted upward or downward to the functional engravings.

Since functional engravings are usually not visible to the naked eye, the functional engravings can first be made visible before their position in the captured image is determined. To this end, for example a specially arranged lighting unit can be provided, which is arranged and/or designed such that the functional engravings in the captured image can be identified, detected and/or determined. In this case, the functional engravings can be made visible, in particular, by a screen being recorded through the spectacle lenses, on which one or more different patterns are displayed, such as stripe projections. Another way to visualize the functional engravings can be accomplished by means of a retroreflection unit, as described for example in the document DE 103 33 426 A1. Another possible realization includes an automatic detection of the engravings, as described for example in the document DE 10 2014 005 281 A1.

The positions of the functional engravings thus made visible in the captured image can be determined graphically, for example, in particular in a software-controlled manner. In this case, first pixel positions in the captured image can be determined, which can be converted into two-dimensional and/or three-dimensional coordinates, in particular in world coordinates in the frame of reference of the earth.

Furthermore, the lens contours of the spectacle lenses are determined in the captured image, i.e. for example at which positions the spectacle lens edges are arranged in the captured image. Here, in particular the pixel positions of the spectacle lens edges can be determined. It may be sufficient to determine the lens contours at least partially and/or in portions and/or pointwise. The determination of the lens contours can be done differently on the finished spectacles than on edge-shaped spectacle lenses without frame. Thus, for determining the lens contours of finished spectacles, the determination of a single spectacle reference point may be sufficient, while more positions in the captured image are determined for determining the lens contours of edge-shaped spectacle lenses. Determining the lens contours may include information about where (e.g. at which pixels) in the captured image the spectacle lens edges are disposed.

Checking of the centration of the finished spectacles or the edge-shaped spectacle lenses takes place taking into account both the determined positions of the functional engravings and the determined position of the at least one reference point and/or the determined lens shape. Furthermore, additional data can be taken into account during the check, in particular known wearer-dependent data. This known, wearer-dependent data can be referred to as the target geometry of the spectacles and/or of the spectacle lenses. Thus, the target geometry may include a target centration of the finished spectacles and/or of the edge-shaped spectacle lenses, in particular a target pupillary distance and/or a target fitting height. Furthermore, the known data may include, for example, the lens thickness. When checking the centration, it can be checked whether visual points of the eyes of a wearer, for whom the spectacles were or should be made, are arranged at predetermined positions on the respective spectacle lenses of the spectacles in the wearing position. In this case, determined actual positions of the visual points can be compared with theoretical target positions of the visual points.

When checking the centration, it can be determined whether the actual positions of the visual points differ from the target positions of the visual points by maximally a predetermined value. This predetermined and/or allowable deviation from the positions of the visual points may be dependent on the type of spectacle lens. Thus, an allowable deviation e.g. in the case of progressive lenses may be less than an allowable deviation in spectacle lenses with a single prescription. Thus, checking may include a check as to whether allowable deviations of the centration are adhered to or not.

The method provides a possibility of checking the centration of the finished spectacles and/or the edge-shaped spectacle lenses automatically where possible. In the method, the human sources of error can be excluded or at least reduced. Checking is carried out at least partially automatically, in particular substantially fully automatically. When determining positions in the captured image, i.e. in particular when determining the position of the functional engravings, when determining the lens contours of the spectacle lenses, a manual confirmation of individual points in the captured images by an optician or another operator can additionally be provided. In other embodiments, this manual check can be dispensed with.

The method simplifies and improves the checking of the centration of the finished spectacles or the edge-shaped spectacle lenses. In particular, when checking the centration, no points must be marked or be on the spectacle lenses. A manual measurement of the centration can be omitted.

According to one embodiment, the at least one spectacle lens is provided either in finished spectacles or as a edge-shaped spectacle lens. Here, the lens contour of the spectacle lens in the captured image is either determined by determining the position of at least one spectacle reference point of the spectacles in the captured image or determined by determining a lens shape of the edge-shaped spectacle lens in the captured image.

Here, the centration of the spectacles or the edge-shaped spectacle lenses is checked taking into account the determined position of the spectacle reference point or the determined lens shape.

In this case, the method step of determining the lens contours is determining the position of at least one spectacle reference point of the finished spectacles in the captured image and/or of a lens shape of the edge-shaped spectacle lenses in the captured image.

In this embodiment, it is thus distinguished whether the centration is checked on finished spectacles or whether the centration of edge-shaped spectacle lenses is checked.

Depending on this, the individual process steps can be carried out differently, in particular the determination of the lens contours.

In the event that the centration is checked on finished spectacles, the position of at least one spectacle reference point of the finished spectacles can be determined in the same image and/or a further captured image. As a spectacle reference point, for example, a center of the nose bridge of the spectacles can be determined. The spectacle reference point serves to compare the positions of the functional engravings with the orientation and position of the spectacle frame and to put them in relation to each other. In particular, it can be determined on the basis of the spectacle reference point how the spectacle lenses are arranged in the spectacle frame. If this at least one spectacle reference point is determined in the captured image, together with the positions of the functional engravings, sufficient data for checking the centration of the finished spectacles is determined. Here, starting from the spectacle reference point, known frame data (e.g. a frame contour) of the spectacle frame can be taken into account in order to determine and/or specify the lens contours in the captured image.

If the centration on edge-shaped spectacle lenses that are not yet fit into a frame is checked, the lens shape of the edge-shaped spectacle lenses can be determined at least partially, instead of the spectacle reference point. This can be done individually for each edge-shaped spectacle lens, or for the two edge-shaped spectacle lenses of a single pair of spectacles at the same time based on a single image, in which both edge-shaped spectacle lenses are shown. In this case, in particular at least partially, a contour of the edge-shaped spectacle lenses, i.e. a course of the edges of the edge-shaped spectacle lenses, can be determined in the captured image, in particular graphically and/or in a software-supported manner. It can be estimated from the lens shape and/or the lens contour at which positions relative to the functional engravings in the finished spectacles the frame edge and/or the lens edge will be arranged. When determining the lens shape, it may be sufficient to determine at least three spaced-apart points, preferably at least four spaced-apart points, on each of the edge-shaped spectacle lenses in the captured image. Here, in particular a temporal, a nasal, an upper and/or a lower point on the spectacle lens edge can be determined in order to determine the lens shape. The lens contour of the spectacle lenses is thus determined by determining the lens shape of the edge-shaped spectacle lenses.

By this distinction between a check of the centration of finished spectacles from the check of the centration of edge-shaped spectacle lenses, the individual process steps are optimized for the respective application.

According to one embodiment, when checking the centration of the spectacle lenses, a parallax shift is taken into account if the functional engravings are arranged on the side of the spectacles or of the edge-shaped spectacle lenses facing away from the image capturing device when capturing the image. The parallax shift is taken into account when checking the centering and can be included in the calculation of the visual point(s). The parallax shift may occur when the functional engravings are arranged on the side of the spectacle lenses facing away from the image capturing device. In this case, the functional engravings in the captured image are captured through the spectacle lenses.

In the calculation of the parallax shift, further data can be used; in particular at least a thickness, at least a refractive index, at least an optical power, at least a face form angle and/or at least a forward inclination of the spectacle lenses can be taken into account. For example, the actual (or real) position of the functional engravings may deviate by up to one or even several millimeters from the position where they are determined directly (i.e. without consideration of the parallax shift) in the captured image. By considering the parallax shift, checking of the centration is improved. If the image is taken from the side of the spectacle lenses on which the functional engravings are arranged, it is possible to dispense with a consideration of the parallax shift. Since the functional engravings can be arranged once on the wearer-facing side of the spectacle lenses and once on the side facing away from the wearer depending on the manufacturer, checking for the presence of a parallax error improves the versatility of the method.

According to one embodiment, when determining the position of the functional engravings, a structure is arranged on a side of the spectacle lenses facing away from the image capturing device, which structure is imaged at least partially in the captured image through the spectacle lenses. The structure may be generated by a screen and/or projected onto the lenses. In particular, the structure may be formed as a stripe pattern and/or have at least a pattern with a plurality of contrast transitions between differently illuminated regions. As an alternative to a screen, the structure may also be designed as a finished static structure printed on a foil or printing surface, which has been generated in advance, for example. When the image is captured, the structure is arranged on the side of the spectacle lenses which is captured through the spectacle lenses when the image is taken. In the captured image, for example, it is possible to determine graphically and/or in a software-controlled manner where, for example, a disturbance of the structure indicates that a functional engraving or an edge of the spectacle lens is arranged at this position. The use of the structure thus simplifies and/or makes it possible to determine the positions of the functional engravings, the knowledge of which is further processed for checking the centration. In other words, the structure makes the functional engravings in the captured image visible and/or determinable.

According to one embodiment, at least a face form angle of the spectacle lenses is determined and the determined face form angle is taken into account when checking the centration of the spectacle lenses. The face form angle is defined in the standards listed at the beginning and describes an inclination of the spectacle lenses in the spectacle frame about a rotation axis, which is oriented substantially vertically in the wearing position. The consideration of the face form angle improves the checking of the centration. Therefore, it is advantageous to include the face form angle in the checking of the centration. As a rule, the face form angle is to be considered only when checking finished spectacles, since edge-shaped spectacle lenses can be arranged substantially without this inclination relative to the optical axis of capture of the image capturing device. When checking the centration of edge-shaped lenses, instead of the face form angle, an inclination angle of the edge-shaped lenses relative to the optical axis of capture of the image capturing device can be taken into account and/or determined in advance, which substantially corresponds to the face form angle. Thus, instead of checking the face form angle, more generally, the (e.g., horizontal and/or vertical) orientation and/or inclination of the spectacle lenses relative to the optical axis of capture of the image capturing device can be determined and taken into account.

In a further development of this embodiment, the face form angle (or more generally: the orientation and/or inclination of the spectacle lenses relative to the optical axis of capture) is determined by evaluating a reflection of at least one laser line on the spectacle lenses. In the method, therefore, exactly the face form angle (or the orientation and/or inclination) at which the spectacle lenses are arranged in the field of capture of the image capturing device is determined. To this end, for example, the reflection of a laser line that is generated by a laser scanner across the finished spectacles or the edge-shaped spectacle lenses can be used. The position of the laser line may vary. In particular, when using a scanner, the laser line can be projected over parts of the surface of the spectacle lenses. In particular, the laser line can be arranged transversely across both spectacle lenses of the spectacles, i.e. in a direction that is essentially horizontal and/or nasal-temporal in the wearing position. Such orientation of the laser line facilitates determining the face form angle, which also describes an inclination of the spectacle lenses in a substantially nasal-temporal direction. The reflection of the laser line can either be registered and/or evaluated by means of a separate measuring device, or be detected and/or determined by means of the image capturing device. In particular, the reflection of the laser line in the image captured by the image capturing device can be determined, registered and/or evaluated.

Here, laser light of a wavelength of about 400 nm to about 500 nm can be used as the laser line. In order to determine the face form angle (or more generally, the orientation and/or inclination of the spectacle lenses relative to the optical axis of capture), a blue laser light is thus used. Blue light has the advantage over red light that a larger part of it is reflected on spectacle lenses, which are often designed to be slightly reflective in the red wavelength range. The limitation to a wavelength above about 400 nm further precludes the use of UV light. Although the reflection for UV light on spectacle lenses would usually be even better than for blue light, additional measures to protect an operator would be required when using UV light. That is why blue laser light is particularly well suited for determining the face form angle.

As an alternative to determining the face form angle by means of a laser line that is projected onto the spectacle lenses, the face form angle can be determined from manufacturing data of a spectacle frame of the spectacles and/or by means of an external measuring device. For example, the face form angle may be known, since it is fixedly specified for the spectacles. The face form angle can either be taken directly from the manufacturing data or be determined, for example, using another external measuring device. In this case, the determined face form angle(s) is/are registered, for example manually input, or automatically transmitted to a checking device, and taken into account when the checking the centration.

According to one embodiment, in the event that the centration is checked on at least one edge-shaped spectacle lens, the edge-shaped spectacle lens is arranged in the field of capture of the image capturing device at a face form angle of about 0° (or more generally: virtually without inclination of the edge-shaped spectacle lenses relative to the optical axis of capture), wherein, when checking the centration, the face form angle is disregarded (or more generally: the orientation and/or inclination of the edge-shaped spectacle lenses relative to the optical axis of capture). When checking the edge-shaped spectacle lenses, they can be arranged in the field of capture of the image capturing device such that the image capturing device captures the image substantially vertically through the edge-shaped spectacle lenses. In other words, the optical axis of capture of the image capturing device is substantially perpendicular to the surface of the edge-shaped spectacle lenses, so that the optical axis of capture of the image capturing device is arranged at a target face form angle of 0° substantially parallel to the viewing direction (at least in a projection onto a horizontal plane from the wearing position). In this case, when the centration is checked, on the basis of the captured image, a face form angle of about 0° can be assumed. Therefore, the face form angle does not need to be considered when checking the centration. The same or something similar may apply to a forward inclination of the edge-shaped spectacle lenses. The checking process can be simplified by the face form angle not being taken into account.

According to one embodiment, a forward inclination of the spectacle lenses is determined and the determined forward inclination is taken into account when checking the centration of the spectacle lenses. The forward inclination of a pair of spectacles is also defined in the aforementioned standards and describes an inclination of the spectacle lenses about a rotation axis, which in the wearing position is oriented substantially horizontally through both spectacle lenses. The forward inclination can be determined by evaluating a reflection of at least one laser line on the spectacle lenses, similar to the face form angle. In this case, the laser line can be projected particularly in a substantially vertical direction across the spectacle lenses. The term vertical refers to the position the finished spectacles or the edge-shaped spectacle lenses would assume in the wearing position. In this case, the laser line can be designed in particular as a blue laser line for the reasons described above. Alternatively or additionally, known values for the forward inclination can be used and/or determined from manufacturing data of a frame of the spectacles, or the forward inclination can be determined by means of an external measuring device. The consideration of the forward inclination further improves the checking of the centration.

One aspect relates to a device for checking the centration of spectacle lenses, comprising:
 a lens receptacle for receiving the spectacle lenses;
 an image capturing device for capturing an image of the spectacle lenses arranged in the lens receptacle;
 an engraving determining means for determining positions of functional engravings of the spectacle lenses in the captured image;
 a geometry determining means for determining lens contours of the spectacle lenses in the captured image; and
 a checking means for checking the centration of the spectacle lenses, taking into account the determined position of the functional engravings, the determined lens contours and a known, wearer-dependent target geometry of the centration.

The device can be used in particular for carrying out the method according to the aspect described above. Therefore, all the statements made in connection with the above aspect also refer to the device and vice versa. In the device, the image capturing device may be formed, for example, as a digital camera, in particular as a CCD camera. The lens receptacle can be designed for receiving and/or arranging the finished spectacles or the edge-shaped spectacle lenses in the field of capture of the image capturing device. Image processing, in particular a software-controlled graphical evaluation of the captured image, may be provided as engraving determining means. The geometry determining means may likewise be realized by a graphical evaluation, in particular by a software-controlled and/or software-supported graphical evaluation. The checking means may also be controlled by software.

In one embodiment of the device, the checking means takes into account a parallax shift when checking the centration of the spectacle lenses if the functional engravings are arranged on the side of the spectacle lenses facing away from the image capturing device when the image is captured. Here, the checking means can first check and/or determine on which side of the spectacle lenses the functional engravings are arranged. Subsequently, depending on the result, the checking means may either take the parallax shift into account or not.

According to one embodiment, the device comprises an orientation determining means for determining an orientation of the spectacle lenses relative to an optical axis of capture of the image capturing device, wherein the checking means is designed to take into account the determined orientation when checking the centration of the spectacle lenses. In this case, the orientation determining means may be designed, in particular, as a face form angle determining means and/or a forward inclination determining means. For example, as described in connection with the previous aspect, the orientation determining means may include a laser line projector that projects at least one laser line onto and/or across the finished spectacles and/or the edge-shaped spectacle lenses. The orientation determining means may in particular include a laser scanner, preferably a laser scanner that emits blue laser light.

According to one embodiment, the image capturing device has a telecentric objective. A telecentric objective is particularly suitable for taking a picture of the finished spectacles or the edge-shaped spectacle lenses, in which the positions of individual points are determined, since the captured images have no distortions. In particular, a structure can be captured particularly well through the spectacle lenses by a telecentric objective, which structure can be graphically evaluated to determine individual positions on the spectacle lenses.

According to one embodiment, the device includes a structure generating means for generating a structure on the side of the spectacle lenses facing away from the image capturing device, wherein the structure in the captured image can be imaged through the spectacle lenses. For example, a screen and/or a (e.g., illuminated) structured surface may be used as the structure generating means. If a screen is used as the structure generating means, then the structure can be controlled in a targeted manner, in particular a brightness of the structure can be adjusted and/or the dimensions of individual elements of the structure may be adjustable.

According to one embodiment, the lens receptacle is substantially transparent and/or the lens receptacle receives the finished spectacles or the edge-shaped spectacle lenses at a lateral region with respect to an optical axis of capture of the image capturing device. This formation of the lens receptacle makes it possible to capture the image such that, for example, a structure is includeed in the captured image through the spectacle lenses. In particular, for this purpose, the lens receptacle can be transparent, for example made of a glass and/or plastic. Alternatively and additionally, the lens receptacle can only hold the spectacles or the spectacle lenses on an edge region, that is to say on a lateral and/or temporal region, so that the image can be taken through the spectacle lenses despite the use of the lens receptacle.

One aspect relates to a computer program product that includes program parts which, when executed on a processor, in a method according to the first aspect, determine the position of the functional engravings, determine the lens contours of the spectacle lenses (which e.g. determine the position of the spectacle reference point of the spectacles and/or or the lens shape of the spectacle lenses), and check the centration of the spectacles or spectacle lenses. Furthermore, program parts of the computer program product can perform further steps of the method, such as the determination of a face form angle, the determination of a forward inclination and/or a corresponding consideration of the orientation/inclination of the spectacle lenses when checking the centration.

DRAWINGS

Figure 2:
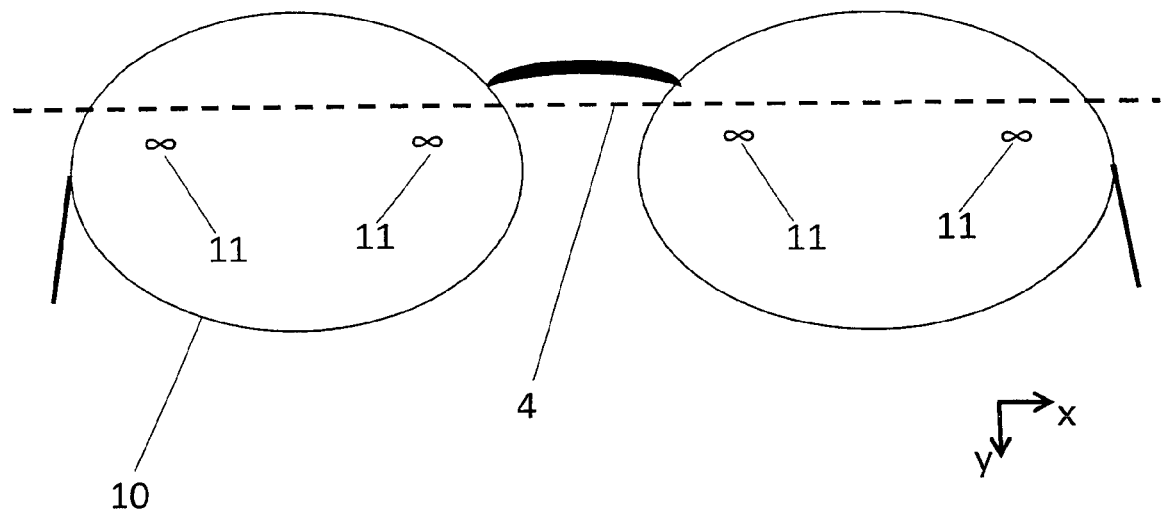
Figure 3:
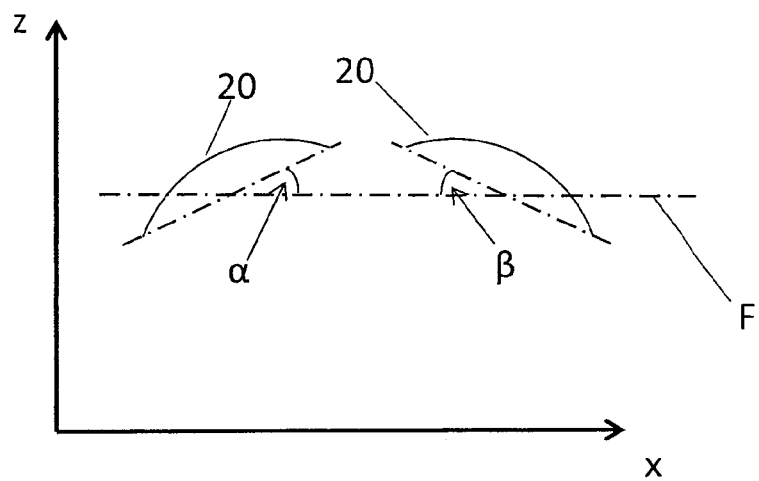
Figure 4:
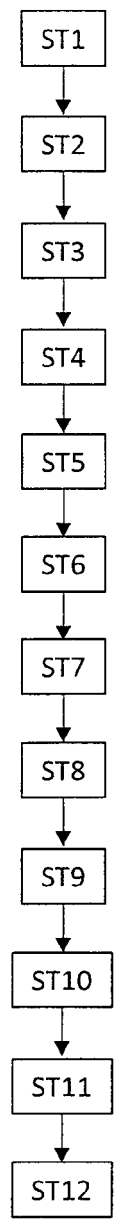

The invention will be described in more detail below with reference to embodiments shown in figures. Individual features shown in the figures may be realized and/or implemented in other embodiments. Like reference numerals may indicate the same or similar features of the embodiments. The figures show:

FIG. 1 a schematically illustrated device for checking the centration of finished spectacles and/or edge-shaped spectacle lenses;

FIG. 2 schematically illustrated spectacles that are examined by a face form angle determining means;

FIG. 3 a schematic illustration of how a face form angle of a pair of spectacles is determined from a surface profile; and FIG. 4 a schematic flow diagram of a method for checking the centration of finished spectacles or edge-shaped spectacle lenses.

DETAILED DESCRIPTION

FIG. 1 shows a schematic illustration of a device 1 for checking the centration of spectacle lenses, i.e. the centration of finished spectacles 10 and/or the centration of edge-shaped spectacle lenses. The device 1 has an image capturing device 2, which may be formed as a CCD camera, for example. The image capturing device 2 has an objective 3, which may be designed, in particular, as a telecentric objective. The orientation of the objective 3 determines the orientation of the optical axis of capture of the image capturing device 2.

The image capturing device 2 is oriented such that the optical axis of capture of the image capturing device 2 faces from the objective 3 of the image capturing device 2 toward the spectacles 10, which is disposed in the field of capture of the image capturing device 2.

The figures show a Cartesian coordinate system, in which the coordinates are denoted by x, y and z. Here, the x and z-directions may be substantially horizontally oriented directions, while the y-direction may be oriented in a vertical direction, i.e. facing from top to bottom. The terms horizontal and vertical refer to directions relative to the spectacles 10 when worn in the wearing position. In the wearing position, the x-direction points from the lens center of a spectacle lens in a substantially nasal or temporal direction, while the z-direction coincides substantially with the zero direction of sight. The y-direction essentially points from an upper spectacle lens edge to a lower spectacle lens edge, i.e. substantially vertically downwards in the wearing position.

In FIG. 1, the optical axis of capture of the image capturing device 2 is arranged such that it is arranged substantially parallel to the z-direction, i.e. facing opposite to the viewing direction.

The manufactured spectacles 10 are arranged in the field of capture of the image capturing device 2 such that the image capturing device 2 can capture an image that includes both the spectacles 10 and a structure generating means 6 arranged on the side of the spectacle lenses of the spectacles 10 facing away from the image capturing device 2. In other words, the image capturing device 2 can capture an image of the texture generating means 6 through the spectacle lenses of the spectacles 10.

The structure generating means 6 may in particular be formed as a screen on which a structure is shown. For example, the structure may be formed as a stripe pattern and/or have stripes. When taking an image of the structure generated by the structure generating means 6 through the spectacle lenses of the spectacles 10, irregularities of the structure can be detected. These irregularities can be assigned, for example, to functional engravings of the spectacle lenses and/or edges of the spectacle lenses.

The spectacles 10 may be arranged on and/or in a lens receptacle 7. The lens receptacle 7 may be formed as a holder, in particular as a transparent holder. The transparent formation of the lens receptacle enables the image capturing device 2 to capture an image of the structure through the spectacle lenses of the spectacles 10, which is indicated by the structure generating means 6. The lens receptacle 7 may alternatively or additionally be formed as a lateral clamping device, which holds the spectacles 10 only on edge side adjacent to the spectacle frame, so as not to hinder or only slightly hinder the capture of the structure through the spectacle lenses.

The device 1 further comprises an orientation determining means 5. The orientation determining means 5 may be formed as a laser scanner, which is designed and provided to project a laser line 4 onto the spectacles 10. The operating principle of the orientation determining means 5 will be discussed in more detail in the following figures.

The device 1 is designed and provided to capture an image of the spectacles 10. Instead of the spectacles 10, also the two spectacle lenses of the spectacles 10 in a edge-shaped state could be used for capturing the image. The device 1 capture at least one image of the spectacles 10, in which it detects the functional engravings of the spectacles 10 and determines their position.

FIG. 2 is a schematic illustration of the finished spectacles 10. The spectacles 10 have a frame with two temples and a nose bridge, into which two spectacle lenses are inserted. As indicated in the figure by the infinity sign, the spectacles 10 have at least two functional engravings 11 on each of the two edge-shaped spectacle lenses.

The exact position of the functional engravings 11 depends on the manufacturer and/or the exact lens model. Usually, each spectacle lens has at least two of the functional engravings 11. Here, the functional engravings 11 are not arranged directly in the center or optical center of the respective spectacle lens, but are arranged in particular to the left and right, i.e. temporally and nasally offset to the visual point of a wearer of the spectacles. In the case of decentralized spectacles, the functional engravings 11 might additionally be arranged in a manner offset upward or downward.

This is, among other things, the case in order not to impair the optical properties of the respective spectacle lens at the visual point. With the naked eye, the functional engravings 11 of a spectacle lens are usually not detectable or only very difficult to detect. In order to be able to detect and/or determine the position of the functional engravings 11 in the captured image, the functional engravings are first made visible. To do so, various possibilities are available.

The image capturing device 2 is oriented such that it has the functional engravings 11 of the adjacent spectacle lenses and/or of the finished spectacles 10 in the image field and/or in its field of capture thereof. Since the spectacle lenses can have different curvatures and/or thicknesses, and since furthermore the frame of the spectacles 10 can be formed to be differently curved, the image is captured through the telecentric objective 3 in order to always obtain a sharp image without perspective distortions. In this case, a calibration can be used to obtain distances and positions of the functional engravings 11, for example, in world coordinates in a plane. This calibration may include knowledge of the distance of the spectacles 10 or the spectacle lenses from the image capturing device 2, as well as a fixed orientation of the spectacles 10 or the spectacle lenses relative to the optical axis of capture of the image capturing device 2. Preferably, as an image, for example, a frontal image of the spectacles 10 can be captured, similar to the spectacles 10 shown schematically in FIG. 2.

In other embodiments, the spectacles 10 may also be captured in the viewing direction. If not the centration of finished spectacles 10 but only the edge-shaped spectacle without frame are checked, the spectacle lenses can be arranged in a known distance from the image capturing device 2 such that the image capturing 2 takes place in the viewing direction through the spectacle lenses. Here, for example, a three-point support may be provided as a lens receptacle 7 for the convex side of the spectaclelenses, which receives these spectacle lenses.

As part of the calibration, the distance of the structure generating means 6 from the image capturing device 2 may also be known. In general, for visualizing the functional engravings 11, use can be made of a lighting unit that is optimized such that the visibility of the functional engravings 11 in the image captured by the image capturing device 2 can be created and/or is given. As such a lighting unit, the structure generating means 6 may be used. For the exact detection of the position of the functional engravings 11 in world coordinates, several images can be captured in this case, for example with different illumination settings and/or pattern settings of the structure generating means 6. These different images can be processed by software to obtain increased visibility of the functional engravings 11. The functional engravings 11 may have the effect that at the positions of the functional engravings 11 a disturbance of the captured pattern and/or the captured structure in the captured images can be detected.

Another way to visualize the functional engravings 11 is to use a retroreflective unit that is used in addition to a lighting unit. In this way, the functional engravings 11 can be detected automatically.

In addition, at least one spectacle reference point can be determined graphically in the captured image, in particular the center of the nose bridge of the finished spectacles 10. The spectacle reference point can be determined, for example, via a corresponding holder that is positioned centrally to the nose bridge of the spectacles 10 and is provided with a marking. In the case of edge-shaped spectacle lenses, instead, the approximate lens shape can be detected and/or determined in order to be able to check the centration.

In other words, for example, the lens receptacle 7 can be designed such that it has at least one special marking that facilitates the detection of the spectacle reference point in the captured image. In particular, the marking may mark the spectacle reference point in the captured image.

The positions of the functional engravings 11 and/or of the spectacle reference point can be determined by software and/or by graphic evaluation by a processing device, which evaluates and/or examines the at least one captured image. The processing device may include a processor and/or may be configured as a computer running a corresponding software. The processing device may also perform the process of finally checking the centration data. Here, the processing device can provide an output that indicates to an operator whether the centration of the spectacles 10 is sufficient or not.

Checking of the centration, in particular the evaluation in the processing device, may include knowledge about at least one of the face form angles at which the spectacle lenses are arranged on the spectacles 10.

FIG. 3 is a schematic illustration of the two face form angles $\alpha$ and $\beta$. Here, $\alpha$ designates the right face form angle and the reference numeral $\beta$ designates the left face form angle of the spectacles 10. The exact position of the face form angles $\alpha$, $\beta$ is defined in the standards mentioned at the beginning.

Depending on the face form angle $\alpha$, $\beta$, distortions in the captured image may occur, which can be taken into account in the exact position determination of the functional engravings 11. The determination of the face form angle $\alpha$, $\beta$ can be done in different ways. For example, the values of the face form angles $\alpha$, $\beta$ can be read out of a database in which the face form angles are stored. In the database, the values of target face form angles can be stored, which result from the manufacturing data of the frames, i.e. from 3D construction data, for example. When using the target face form angles from such a database, a relatively simple and fast determination of the face form angles $\alpha$, $\beta$ can be done.

However, since these theoretical target face form angles do not always coincide with reality and, in particular, deviations may occur both in the manufacture of the spectacle frames and during the insertion of the spectacle lenses into the frame, which change the real face form angles, the use of this theoretical target face form angle is sometimes inaccurate.

Preferably, therefore, the real face form angles $\alpha$ and $\beta$ are determined and used when checking the centration. For this purpose, the face form angles $\alpha$ and $\beta$ can be determined, for example, with an external measuring device, for example a tracer or a mechanical face form angle gauge.

In addition to the engraving visualization, however, the device 1 preferably has its own measuring device for the face form angles $\alpha$ and $\beta$ of the inserted spectacles 10. For this purpose, a surface measurement of the spectacles 10 can be performed by analyzing a reflection of one or more laser lines. To this end, the orientation determining means 5 may be provided, which may in particular be designed as a face form angle determining means and which may comprise a laser scanner. The orientation determining means 5 projects at least the one laser line 4 across the surface of the spectacles 10. This is shown in more detail in FIG. 2, in which the laser line 4 is projected across the spectacles 10 substantially horizontally, i.e. approximately parallel to the x-direction. In this case, the laser line 4 is projected across the surface of the spectacles 10 preferably offset from the functional engravings 11. Thereby, the detection of the functional engravings 11 is not disturbed by the laser line 4 in the image.

For this purpose, the laser line 4 is preferably generated with a blue light, which is particularly well reflected on the surface of spectacle lenses, without posing a hazard to an operator, such as e.g. UV light.

From the exact profile of the laser line 4 in the captured image, it is possible to determine a surface profile 20 which, as shown in FIG. 3, extends substantially along the surface of the spectacle lenses. The surface profile 20 results from the surface scan, which can be performed and/or evaluated by means of the orientation determining means 5. The reflection of the at least one laser line can be detected by an additional capturing device, or else by the image capturing device 2. In this case, the exact profile of the laser line 4 can be arranged oriented with the image capturing device 2, so that e.g. due to known and/or determined positions in the captured image conclusions as to the profile of the laser line 4 can be drawn. Furthermore, based on the profile of the laser line 4, the positions of the frame and/or of the lens edges in space and/or in world coordinates can be specified and determined. In other words, the profile of the laser line 4 is oriented with the spectacles 10 and/or the spectacle lenses, and this orientation is known to the processing device. Particularly in the case of a known lens geometry, the exact position of the spectacle lenses in space can be specified and/or determined.

Here, a forward inclination of the spectacle frame can be further determined and taken into account when checking the centration. To this end, at least one second laser line can be projected onto the spectacles 10 or the spectacle lenses, which, for example, can be oriented essentially perpendicular to the laser line 4. For this purpose also, the orientation determining means 5 may be formed. In particular, at least one laser line oriented substantially parallel to the y-axis can be projected onto each of the two spectacle lenses, from which the forward inclination can be calculated. This laser line for determining the forward inclination can also be designed in blue and be projected onto the spectacles 10 or the spectacle lenses in a manner offset from all functional engravings 11.

It is known to the person skilled in the art how the surface profile 20 of the spectacles 10 shown in FIG. 3 can be used to calculate the face form angles $\alpha$ and $\beta$ and can be taken, for example, from the standards mentioned at the outset. For this purpose, as an intermediate step, for example a frame plane F can be determined, which is also shown in FIG. 3. The face form angles $\alpha$ and $\beta$ can be determined as a cutting angle with the frame plane F, in particular from geometrical and radiation-optical calculations.

If instead of the spectacles 10 only edge-shaped spectacles are examined, it is possible, as already mentioned above, to use a lens receptacle 7 that arranges the spectacle lenses approximately at a face form angle of about 0° in the field of capture of the image capturing device 2. Therefore, in this case, the checking of the centration can be performed without considering the face form angle and/or the forward inclination. Alternatively, the precise orientation of the edge-shaped spectacle lenses in the field of capture of the image capturing device 2 can also be determined with the aid of at least one laser line 4 as described above, which is projected onto the spectacle lenses by the orientation determining means 5.

From the face form angles $\alpha$ and $\beta$ and/or the orientation/inclination of the spectacle lenses, for example with the help of the associated theoretical data, such as a lens thickness, a front surface, a back surface, etc., it is possible to calculate an optionally occurring parallax shift by ray tracing by observing the functional engravings 11 through the spectacle lenses. By taking into account the parallax shift, deviations of the real positions of the functional engravings 11 from the positions of the functional engravings 11 determined in the image can be determined exactly. To check the centration, the exact position of the different functional engravings 11 can be used. By checking the centration, the manufacturing quality and/or the fitting quality of the finished spectacles or the edge-shaped spectacle lenses is checked.

As a structure generating means 6, a printed foil that may be specially illuminated may be used, for example.

The surface profile 20, as shown in FIG. 3, can be determined completely by means of a laser scan as described. Alternatively, only parts of the surface profile 20 may be determined, which can be extrapolated up to the frame edges. From the end points of the surface profile 20, the face form angles $\alpha$ and $\beta$ can be calculated.

FIG. 4 shows a schematic flow diagram of an embodiment of a method for checking the centration of finished spectacles or of edge-shaped spectacle lenses. Here, in a step ST1, the object to be examined (i.e. the finished spectacles or the edge-shaped spectacle lenses) is first arranged in the lens receptacle 7, cf. also FIG. 1.

Subsequently or already in advance, theoretical target positions of the functional engravings 11 are calculated in a step ST2, i.e. positions at which the functional engravings 11 should be arranged if the spectacles 10 or the spectacle lenses are centered correctly. In this case, in particular a target distance from a nasal and/or temporal lens edge can be calculated, as well as a target distance from a lower and/or upper lens edge. The target distances can be calculated for all four functional engravings 11 (i.e. two per spectacle lens). Here, the target distances either from an actual lens edge or from the edge of a rectangle placed around the respective spectacle lens on which the respective functional engraving is arranged can be calculated. Such a rectangle surrounding the spectacle lens is regularly used in the box dimension and/or boxing system when edge-cutting and/or fitting spectacle lenses and is known to the person skilled in the art.

A nasal edge of the surrounding rectangle can be determined by subtracting half of the distance between the lenses from the center of the frame, which is also abbreviated as Dbl. This refers to the bridge width of the spectacle frame.

Furthermore, in a step ST3, a theoretical target rotation of the spectacle lenses can be calculated, that is, a rotation at which the spectacle lenses are arranged in the captured image. The target rotation may include, for example, a theoretical target face form angle and/or a theoretical target forward inclination. The rotation may both be a rotation of the spectacle lenses of the manufactured spectacles and a rotation of edge-shaped spectacle lenses that are not yet inserted in a spectacle frame. The theoretical target rotation may include an orientation and/or inclination with respect to the optical axis of capture of the image capturing device 2.

As already stated above, in a step ST4, an image of the spectacles 10 or of the spectacle lenses is captured, for example by the image capturing device 2 shown in FIG. 1. The image includes both the spectacles 10 or spectacle lenses, and e.g. a structure provided by the structure generating means 6. Furthermore, the image may include light from an illumination source, which serves to visualize and/or mark the functional engravings 11. If the structure generating means 6 is formed as a screen, both the structure and the light can be provided by the screen.

In the captured image, a lens contour of the spectacle lenses is determined in a step ST5, based on which e.g. a surrounding rectangle around the two spectacle lenses can be created for further calculation. It is also possible to only detect at least one spectacle reference point, based on which the orientation, inclination, etc. of the spectacle frame can be determined in the captured image.

In the captured image, the position of the functional engravings 11 is determined in a step ST6. In this case, at least the positions of two functional engravings 11 can be determined per spectacle lens.

In the captured image, the positions of the functional engravings 11 may first be available in pixel coordinates. The same applies to the lens contours of the spectacle lenses and/or the positions of the spectacle reference points. The pixel coordinates can be converted into SI units, for example in millimeters and/or in world coordinates, in a step ST7 with the knowledge of a calibration.

Subsequently, the distances of the respective functional engravings can be calculated with the aid of the determined positions. In this case, in a step ST8, the distances from a nasal and/or temporal edge of the surrounding rectangle can be determined and in a step ST9, the distances from a lower and/or upper edge of the surrounding rectangle can be determined. In other words, actual distances are calculated in steps ST8 and ST9, in contrast to the target distances calculated above in step ST2, which should include the positions of the functional engravings if there is a correct centration.

When checking the centration, an actual rotation of the spectacle lenses can be taken into account in a step ST10, in particular the actual face form angles and/or the actual forward inclinations of the spectacle lenses. Alternatively or additionally, an actual vertical inclination and/or an actual horizontal inclination of the spectacles can be taken into account. Furthermore, in the calculation of the actual distances from the nominal distances, a parallax shift can be taken into account, which always results when the functional engravings 11 are arranged on the side of the spectacle lenses facing away from the image capturing device 2.

Finally, in a step ST11, the positional deviations (ACTUAL-TARGET) of the individual functional engravings 11 can be calculated, i.e. in particular a deviation of the actual position from the target position of the functional engravings that has been determined theoretically beforehand.

In order to check the centration, in a step ST12, in particular an actual pupillary distance (abbreviated actual PD) and/or an actual fitting height (abbreviated actual FH) can be compared with the respectively associated target pupillary distance (abbreviated target PD) and/or a theoretically determined target fitting height (abbreviated target FH). Thus, it is possible to calculat how much the actual PD deviates from the target PD and/or how much the actual FH deviates from the target FH, e.g. by means of the equations:

ACTUAL-PD=TARGET-PD+(horizontal deviation of the nasal engraving+horizontal deviation of the temporal engraving)/2;

and

ACTUAL-FH=TARGET-FH+(vertical deviation of the nasal engraving+vertical deviation of the temporal engraving)/2.

In the calculation, a distinction is made between the position of the nasal engraving and the position of the temporal engraving. Here, the nasal engraving is the functional engraving of the respective spectacle lens which in the wearing position is arranged closer to the nose of the wearer, while the temporal engraving is the functional engraving of the respective spectacle lens which in the wearing position is further away from the nose of the wearer.

If the determined deviation is less than an allowable and/or permissible deviation, then the result of the check may be that there is a sufficiently good centration. If at least one of the two actual values deviates from the theoretically determined target values more sharply than an allowable tolerance, the check of the centration may be negative. Depending on the result of the check, an output may be made which indicates to an operator what the result the check has yielded.

Optionally, a rotation of the respective spectacle lens within the frame can be checked in addition. In this case, the rotation can be calculated and/or measured from the actual position of the functional engravings. Checking of the rotation of the spectacle lens(es) may be taken into account in the result of the check of the centration.

The embodiment shown in FIG. 4 is to be understood as an example. Instead of the pupillary distance and the fitting height, a deviation from an absolute target position could also be checked, for example in the two-dimensional boxing system or in three-dimensional world coordinates.

In the context of this invention, the terms "substantially" and/or "about" may be used to include a deviation of up to 5% from a numerical value following the term, a deviation of up to 5° from a direction following the term and/or from an angle following the term.

LIST OF REFERENCE NUMBERS 1 device
2 image capturing device
3 objective
4 laser line
5 orientation determining means
6 structure generating means
7 lens receptacle
10 spectacles
11 functional engraving
20 surface profile F frame plane
α right face form angle
β left face form angle

The invention claimed is:

1. A method for checking the centration of a spectacle lens, comprising:
arranging the spectacle lens in a field of capture of an image capturer;
capturing an image of the spectacle lens via the image capturer;
determining positions of functional engravings of the spectacle lens in the captured image using a structure that is generated on a side of the spectacle lens facing away from the image capturer, the structure being imaged at least partially in the captured image through the spectacle lens;
determining a lens contour of the spectacle lens in the captured image; and
checking the centration of the spectacle lens by taking into account:
the determined position of the functional engravings,
the determined lens contour, and
a predetermined wearer-dependent target geometry of the centration.

2. The method according to claim 1, wherein:
the spectacle lens is provided either in finished spectacles or as an edge-shaped spectacle lens,
the lens contour of the spectacle lens in the captured image is determined by determining either (i) the position of at least one spectacle reference point of the finished spectacles in the captured image, or (ii) a lens shape of the edge-shaped spectacle lens in the captured image, and
the centration of the finished spectacles or of the edge-shaped spectacle lens is checked taking into account the determined position of the spectacle reference point or the determined lens shape.

3. The method according to claim 1, wherein when checking the centration of the spectacle lenses, a parallax shift is taken into account if the functional engravings are arranged on the side of the spectacle lens facing away from the image capturer when capturing the image of the spectacle lens.

4. The method according to claim 1, further comprising:
determining a face form angle of the spectacle lens, and
wherein checking the centration of the spectacle lens further comprises taking into account the determined face form angle.

5. The method according to claim 4, wherein determining the face form angle comprises evaluating a reflection of a laser line on the spectacle lens.

6. The method according to claim 5, wherein the laser line comprises laser light having a wavelength between 400 nm and 500 nm.

7. The method according to claim 4, wherein determining the face form angle comprises using manufacturing data of a spectacle frame of the spectacle lens or an external measuring device.

8. The method according to claim 1, wherein the face form angle is disregarded when the centration is checked on an edge-shaped spectacle lens arranged in the field of capture of the image capturer at a face form angle of about 0°.

9. The method according to claim 1, further comprising:
determining a forward inclination of the spectacle lens, wherein checking the centration of the spectacle lens further comprises taking into account the determined forward inclination.

10. A device for checking the centration of a spectacle lens, comprising:
a lens receptacle configured to receive the spectacle lens;
an image capturer configured to capture an image of the spectacle lens arranged in the lens receptacle;
a structure generator configured to generate a structure on a side of the spectacle lens facing away from the image capturer, the structure in the captured image being imaged through the spectacle lens,
an engraving determiner configured to determine positions of functional engravings of the spectacle lens in the captured image;
a geometry determiner configured to determine a lens contour of the spectacle lens in the captured image; and
a checker configured to check the centration of the spectacle lens by taking into account:
the determined position of the functional engravings,
the determined lens contour, and
a predetermined wearer-dependent target geometry of the centration.

11. The device according to claim 10, wherein the checker is configured to take into account a parallax shift when checking the centration of the spectacle lens if the functional engravings are arranged on the side of the spectacle lens facing away from the image capturer when the image is captured.

12. The device according to claim 10, further comprising:
an orientation determiner configured to determine an orientation of the spectacle lens relative to an optical axis of capture of the image capturer, and
wherein the checker is configured to take into account the determined orientation when checking the centration of the spectacle lens.

13. The device according to claim 10, wherein the image capturer includes a telecentric objective.

14. The device according to claim 10, wherein the lens receptacle is formed to be substantially transparent or the lens receptacle receives the spectacle lens at a lateral region with respect to an optical axis of capture of the image capturer.

15. A non-transitory computer-readable medium comprising program parts that, when executed on a processor associated with a device for checking the centration of a spectacle lens, cause the device to:
arrange the spectacle lens in a field of capture of an image capturer;
capture an image of the spectacle lens via the image capturer;
determine positions of functional engravings of the spectacle lens in the captured image using a structure that is generated on a side of the spectacle lens facing away from the image capturer, the structure being imaged at least partially in the captured image through the spectacle lens;
determine a lens contour of the spectacle lens in the captured image; and
check the centration of the spectacle lens by taking into account:
the determined position of the functional engravings,
the determined lens contour, and
a predetermined wearer-dependent target geometry of the centration.

* * * * *